J. NORTON.
Cartridge.
No. 34,443.
Patented Feb. 18, 1862.
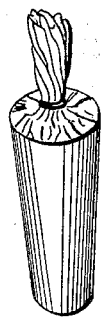
Witnesses.
Henry Johnson
Thomas J. Byrne
Inventor.
John Norton

UNITED STATES PATENT OFFICE.

JOHN NORTON, OF ROSHERVILLE, COUNTY OF KENT, ENGLAND.

IMPROVEMENT IN MODES OF SPLITTING STUMPS OF TREES, TIMBER, &c.

Specification forming part of Letters Patent No. 34,443, dated February 18, 1862.

*To all whom it may concern:*

Be it known that I, JOHN NORTON, of Rosherville, county of Kent, England, have invented a new and useful Improvement in Mode of Splitting Stumps of Trees, Timber, &c., of which the following is a specification.

My invention relates to a peculiar system or mode of splitting the stumps of trees in clearing forest land, or for splitting up large blocks of timber for fire-wood or other purposes.

According to my invention I propose to employ a paper cartridge similar to the one illustrated on the annexed drawing, and to fill the lower or stiff portion of the case with percussion-powder, after which the upper or thinner portion of the case is tied close above the top of the stiff part, as shown in the drawing, when the cartridge is ready for use. In splitting a stump by the aid of this cartridge, I first bore a hole, by means of a common auger, into the stump a suitable depth and introduce the cartridge, which I force down to the bottom of the hole. The ramming-rod is allowed to project outside the hole and rests upon the cartridge, when, by giving it a sharp blow, the cartridge will be exploded and the stump rent into fragments, which are easily extracted from the ground. In lieu of filling the cartridge entirely with percussion-powder, it may be only half-filled therewith, and then an igniter in the form of a few lucifer match-heads inclosed in a piece of thin paper is inserted, when the rest of the cartridge is filled up with more percussion-powder and securely tied as before. A very moderate blow will explode this cartridge.

In order to prevent accidents arising from the explosion, and to enable the operator to retire to a safe distance from the stump or block of timber, I propose to take a heavy plank of timber and lay one end of it on the surface of the stump alongside the projecting head of the iron rod. I then place a small block of wood, about twenty inches in height, having a long cord tied to it under the head of the plank, so that the plank is raised and propped up about sixteen inches above the head of the iron rod. On pulling away the supporting-block by means of the string, the plank falls on the head of the iron rod or bar and the cartridge explodes, splitting the stump asunder.

Having now described the nature of my invention and the mode of carrying out the same in practice, I may observe, in conclusion, that what I claim as novel and original is—

The general system or mode of splitting stumps of trees or large blocks of timber by the aid of cartridges of percussion-powder, as hereinbefore described.

In testimony whereof I have signed my name to this specification in the presence of two subscribing witnesses.

JOHN NORTON.

Witnesses:
    J. HENRY JOHNSON,
47 *Lincoln's Inn Fields, London, Attorney and Patent Attorney.*
    THOS. I. BYRNE,
        *His Clerk.*